(No Model.)
W. JASPER.
VELOCIPEDE.
No. 426,384. Patented Apr. 22, 1890.
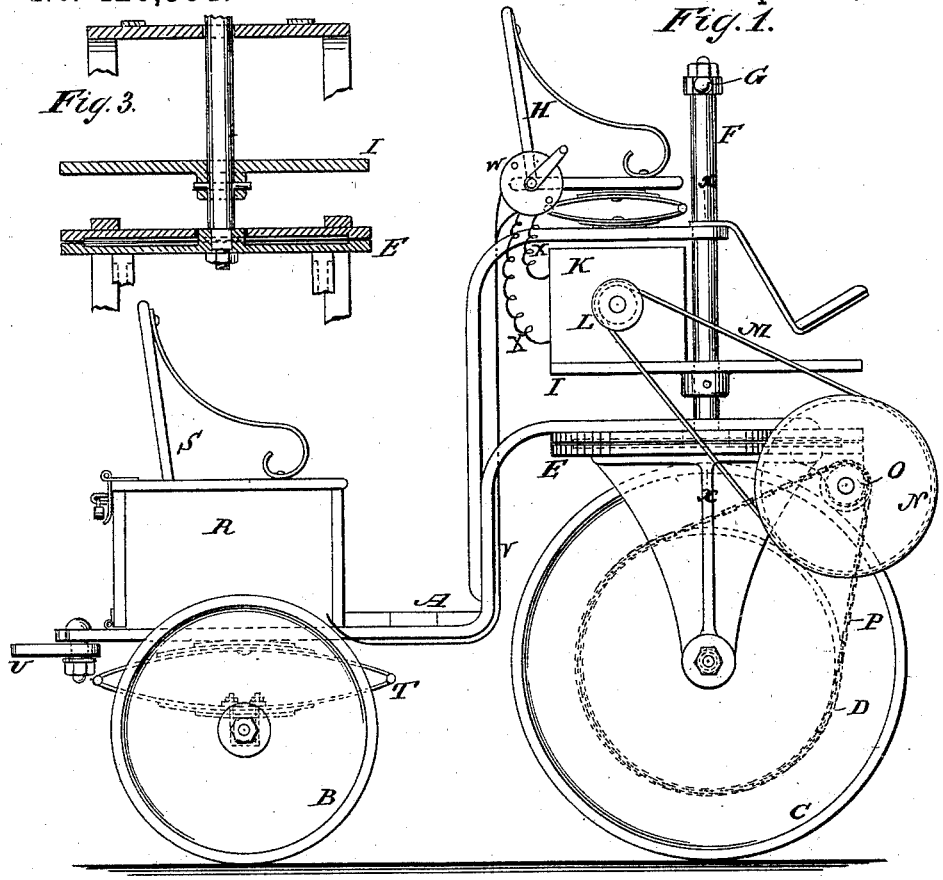
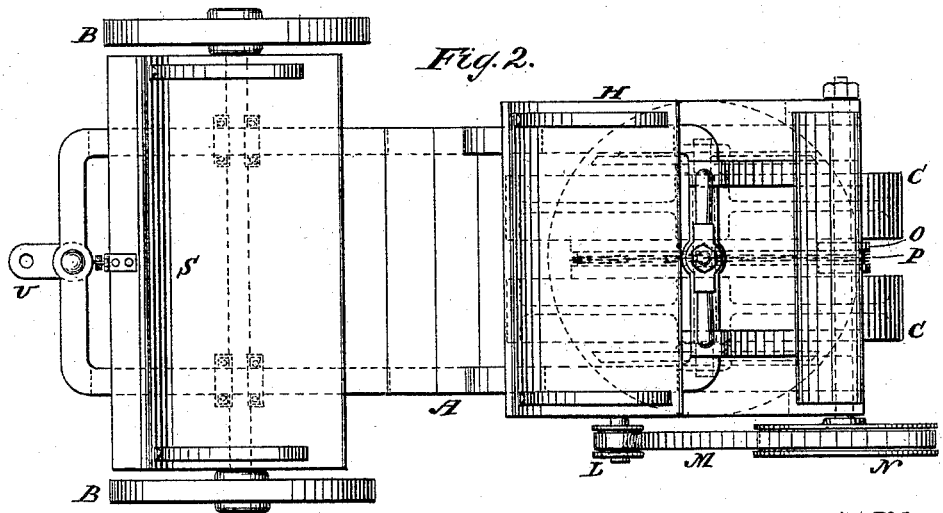
WITNESSES
Edward Wolff
William Miller
INVENTOR
Wilhelm Jasper.
BY
Van Santvoord & Hauff,
ATTORNEYS

UNITED STATES PATENT OFFICE.

WILHELM JASPER, OF NEW YORK, N. Y.

VELOCIPEDE.

SPECIFICATION forming part of Letters Patent No. 426,384, dated April 22, 1890.

Application filed October 24, 1889. Serial No. 328,057. (No model.)

*To all whom it may concern:*

Be it known that I, WILHELM JASPER, a citizen of the United States, residing at New York, in the county and State of New York, have invented new and useful Improvements in Velocipedes, of which the following is a specification.

This invention has for its object to provide an economic and readily-applicable driving mechanism for such apparatus as velocipedes or tricycles; and the invention consists in the details of construction set forth in the following specification and claims, and illustrated in the accompanying drawings, in which—

Figure 1 is a side elevation of a velocipede. Fig. 2 is a plan view of Fig. 1. Fig. 3 is a section along $x\,x$, Fig. 1.

In the drawings, the letter A indicates a frame or support mounted on wheels B B C. The wheel C is shown made in two parts, between which is fixed a pulley D, so as to turn with the wheel C. The wheel C is mounted on a fifth-wheel or rotary frame E, so as to serve for a steering-wheel. To the rotary frame E is secured a shaft F, having a handle G within reach of the driver on the seat H, so that said driver can readily steer the vehicle.

The shaft F carries a support I, having an electric motor K, whose pulley L imparts motion to the belt M and pulley N. The pulley N is connected to pulley O, and a belt or chain P conveys motion from the pulley O to the pulley D and wheel C, so that said wheel acts as a driving and steering wheel. The pulleys N O are mounted on the rotary frame or fifth-wheel, and as the motor K and pulleys L N O all swivel with the wheel C no disengagement or derangement of the belts M P is likely to occur.

The seat H is shown mounted on an arm or standard Q. The frame A carries a storage-battery R. By connecting the battery with the motor K in any suitable well-known way the motor can be stopped, started, or reversed, as required. The frame A may be provided with a seat S, and springs T may be applied to diminish the jarring of the seats H S.

The battery R can be conveniently made in the form of a storage-battery, which can be readily charged when exhausted, or, if desired, one battery can be readily dismounted and another battery put in place on the frame A.

A coupling attachment U can be applied to the device for the purpose of hitching on one or more vehicles, if desired.

The battery is shown as being connected to the motor by conductors or a cable V, leading to a switch W, from which conductors X X lead to the motor. The switch W, being within reach of the driver at H, enables said driver to readily start, stop, or back the vehicle.

What I claim as new, and desire to secure by Letters Patent, is—

1. The combination, with the frame or support having the supporting-wheels B and a driving and steering wheel C, of a rotary frame for said wheel C, and an electric motor supported on said rotary frame and connected to said wheel C, substantially as described.

2. The combination, with the frame or support having the supporting-wheels B and a driving and steering wheel C, of an electric battery mounted on said frame, a rotary frame for the wheel C, and an electric motor connected to said battery and to the wheel C and supported on said rotary frame, substantially as described.

In testimony whereof I have hereunto set my hand in the presence of two subscribing witnesses.

WILHELM JASPER.

Witnesses:
J. VAN SANTVOORD,
E. F. KASTENHUBER.